(12) United States Patent
Daios

(10) Patent No.: US 12,402,575 B2
(45) Date of Patent: Sep. 2, 2025

(54) ELONGATED WEB FOR COVERING AGRICULTURAL CULTIVATED PLANTS

(71) Applicant: Asterios Daios, Naoussa (GR)

(72) Inventor: Dimitrios Daios, Salonika (GR)

(73) Assignee: Asterios Daios, Naoussa (GR)

( * ) Notice: Subject to any disclaimer, the term of this patent is extended or adjusted under 35 U.S.C. 154(b) by 26 days.

(21) Appl. No.: 18/137,581

(22) Filed: Apr. 21, 2023

(65) Prior Publication Data
US 2023/0371448 A1   Nov. 23, 2023

(30) Foreign Application Priority Data

May 23, 2022  (EP) .................................... 22174887
Jul. 5, 2022    (EP) .................................... 22178197

(51) Int. Cl.
*A01G 13/02* (2006.01)
*A01G 13/21* (2025.01)

(52) U.S. Cl.
CPC .................................... *A01G 13/21* (2025.01)

(58) Field of Classification Search
CPC .... A01G 13/0206; A01G 13/20; A01G 13/21; A01G 13/22; A01G 13/0231; A01G 9/1438; A01G 9/1407
See application file for complete search history.

(56) References Cited

U.S. PATENT DOCUMENTS

| | | | | |
|---|---|---|---|---|
| 4,285,162 A | * | 8/1981 | Hilton ................... | A01G 9/1438 47/29.1 |
| 2004/0244284 A1 | * | 12/2004 | Voehringer ............ | A01G 13/21 47/23.1 |
| 2015/0201565 A1 | * | 7/2015 | Toye ...................... | A01G 13/21 47/29.1 |
| 2016/0262318 A1 | * | 9/2016 | Lloyd .................. | E04F 10/0614 |
| 2018/0054980 A1 | * | 3/2018 | Marques ................. | A01G 13/28 |
| 2018/0209162 A1 | * | 7/2018 | von Behrens ........... | H02S 40/22 |
| 2019/0053440 A1 | * | 2/2019 | Lysak ................... | A01G 9/1438 |
| 2019/0059244 A1 | * | 2/2019 | Toye ...................... | A01G 13/21 |

(Continued)

FOREIGN PATENT DOCUMENTS

| | | | |
|---|---|---|---|
| CL | 2021002271 A1 | 4/2022 | |
| CL | 2021002272 A1 | 4/2022 | |
| DE | 20216808 U1 * | 4/2003 | ......... A01G 13/0206 |

(Continued)

Primary Examiner — Trinh T Nguyen
(74) Attorney, Agent, or Firm — Jason H. Vick; Amped IP LLC

(57) ABSTRACT

A web for covering plants with a base film of plastic. An upper region of the base film has a ventilation area extending in the longitudinal web direction and a plurality of openings A plurality of spaced-apart fastening openings are on the upper longitudinal edge of the base film A cover film which runs in the longitudinal web direction of the base film and is reflective on the weather side, is applied to the ventilation area The cover film is welded to the base film in a first and a second connecting region The first and second connecting region are each arranged at least in the longitudinal edge-side region of the cover film and the second connecting region facing the lower longitudinal edge of the cover film has a plurality of welding regions. Each welding region of the second connecting region is associated with the nearest fastening opening.

15 Claims, 12 Drawing Sheets

(56) References Cited

U.S. PATENT DOCUMENTS

2022/0167569 A1* 6/2022 Daios .................... A01G 9/1438
2022/0167570 A1* 6/2022 Daios .................... A01G 13/21

FOREIGN PATENT DOCUMENTS

| EP | 3172961 A1 | 5/2017 |
| EP | 4005366 A1 | 6/2022 |
| EP | 4005367 A1 | 6/2022 |
| WO | WO 2014/014365 A1 | 1/2014 |

* cited by examiner

ELONGATED WEB FOR COVERING AGRICULTURAL CULTIVATED PLANTS

CROSS-REFERENCE TO RELATED APPLICATIONS

This application claims the benefit under 35 U.S.C. 119(a) to European Patent Application No. 22 174 887.4, filed 23 May 2022 and European Patent Application No. 22 178 197.4, filed 9 Jun. 2022 the disclosures of which are incorporated herein by reference in their entirety.

SUMMARY

The present disclosure concerns an elongated web for covering agricultural cultivated plants, especially soft fruits, in particular cherries, with a base film of plastic.

Cultivation in covered areas has been particularly developed in recent decades. The state of the art includes glass panes, greenhouses and special plastic coverings for soft fruits. With the prior art, the placement, fastening and fixing of the plastic film is achieved with ropes or with elastic cords or with soft PVC-tubing. However, the costs of binding the plastic film are significant as skilled staff and considerable amounts of working hours are required to tie the plastic film to the support structure. Tying the film, in most cases, is carried out by employing knots on simple eyelets or grommets that the plastic film bears.

The distance between the eyelets is commonly between 50 to 100 cm. It is thus understood that to tie a plastic film of 10 m length, bearing in mind that the eyelets are spaced 50 cm along the lengths of the film on each side, one would need 40 knots on each side, namely 80 knots, including both sides of the plastic film. Furthermore, if for any reason one needs to realign the film on the structure, for example after strong winds caused a misplacement of the said film, the process of untying the film and tying it again is particularly time consuming and consequently entails high costs.

The support structure can include a support post, frame or bar of a frame and/or a rope, which may be fastened to the support post. The elongated web can thus design a gabled roof for the cultivated plants underneath. In principle, it is also possible to use the elongated web in greenhouses. In particular, the web protects the cultivated plants from rain and/or effects of the weather.

After harvesting the cultivated plants, the elongated webs are rolled up in order to protect the webs from further exposure to the weather. The rolled webs are then fastened to the corresponding support structure, in particular the tensioning ropes, in particular by first gathering the web together and fastening it afterwards. An additional reflective, tubular film is then applied to this structure, or a corresponding film is applied and connected to the web, laminating it. This film is necessary because a complete removal of the film from the support structure would cause much more effort due to the above-mentioned complex application of the webs. The webs should therefore preferably remain in the folded and/or gathered state on the support structure, in particular the tensioning ropes, in the state covered by the reflective film.

The application of this additional film protecting the elongated web from UV radiation is necessary to protect the elongated web from excessive weathering and thus enable long-term use of the elongated web. In this way, multiple rather than single use of the elongated web can be ensured, which is preferable for economic and ecological reasons.

However, the additional holding ready and pulling on and/or laying on of the protective film is associated with a high effort, which results both from the storage of the protective films in the state of non-use and from the additional application after the fastening of the folded and/or gathered web to the support structure, in particular the tensioning ropes.

The object of the present disclosure is to avoid or at least substantially reduce the aforementioned disadvantages of the prior art.

The aforementioned object of the disclosure is solved by an elongated web for covering agricultural plants, in particular soft fruits, preferably cherries, with a base film made of plastic. In the upper, preferably in the upper longitudinal edge-side, region of the base film, there is provided a ventilation area extending in the longitudinal web-direction and having a plurality of ventilation openings. Further, a plurality of spaced-apart, namely reinforced, fastening openings, preferably eyelets, for fastening tensioning means, in particular tensioning ropes, are provided on the upper longitudinal edge of the base film.

Moreover, a cover film of plastic is provided which runs in the longitudinal direction of the base film and is reflected on the weather side. This cover film is applied to the ventilation area.

The cover film is welded to the base film in a first and second connecting region extending in the longitudinal direction of the base film, wherein the first and the second connecting region are each arranged at least in the longitudinal edge-side region of the cover film. The second connecting region facing the lower longitudinal edge of the cover film has a plurality of welding regions spaced apart from one another. Each welding region of the second connecting region is associated with the nearest fastening opening, in particular eyelet, in such a way that the welding region and the fastening opening associated with the welding region lie transversely, preferably orthogonally, to the longitudinal web direction of the base film at least substantially in alignment.

The ventilation openings of the ventilation area serve in particular for aeration and/or deaeration of the covered area and allow in particular hot and/or humid air to escape from the covered area. The ventilation openings can have the same or a different design. Preferably, all the ventilation openings are at least substantially designed equally.

The cover film can be applied to the base film in such a way that, when the base film is stretched, free spaces between the cover film and the base film in the ventilation area are provided. These free spaces can be used in particular for air exchange. To form these free spaces, it is not necessary for the cover film, which can preferably be designed as a continuous sheet like the base film, to be longer than the base film as a whole or at least in the area of the ventilation areas. Preferably, the base film and the cover film have at least substantially the same length. Ultimately, the free spaces can be formed in particular by the stretched state of the base film. In particular, the cover film is applied in the area of the ventilation area in such a way that the cover film comprises the same width (in cross direction) or a smaller width (in cross direction) than the entire ventilation area and the same length as the base film in the area of the ventilation area.

The cover film can especially protect the covered area from rain and/or weather influences. Preferably, the cover of the ventilation area can ensure that at least essentially no rain can penetrate through the ventilation openings into the covered area. Thus, damage to cultivated plants can be avoided.

Preferably, the aligned alignment of the welding region of the second connecting region to the fastening openings associated to the welding region is achieved in the tensioned fastening state of the elongated web.

In this context, it is understood in particular that an alignment of the welding region of the second connecting region to the nearest fastening opening is to be understood in such a way that the welding region can comprise a smaller or larger length than the maximum outer diameter of the nearest fastening opening and/or the fastening opening associated with the welding region. Ultimately, at least part of the welding region of the second connecting region overlaps with the associated fastening openings—in the cross direction (i.e. orthogonally to the longitudinal web direction). Thus, under an aligned arrangement and/or alignment of the fastening openings and the welding region associated with the fastening opening, an, at least partial, overlap of the fastening opening and the welding region associated with the fastening opening is provided in the fastening state, wherein the fastening opening is naturally spaced from the welding region of the second connecting region, which results not least from the width of the cover film. However, an overlap is preferably to be understood as meaning that in particular the welding region extends at least over a section of the diameter of the fastening opening associated with the welding region.

The reflective design on the weather side of the cover film is provided in particular over the entire surface. In further embodiments, the cover film is also designed in particular as a reflective film on the weather side, at least in some areas. The reflective properties arise in particular with respect to and/or in relation to solar radiation. In particular, the cover film allows incident light in the area of the cover film to be reflected back in the direction from which it comes.

Preferably, the cover film is arranged in such a way that in the tied and/or gathered state of the web, in which the web is attached to the support structure, in particular the tensioning ropes, the top side of the web is covered with the cover film. Thus, according to the disclosure, an additional application of a reflective tubular protective film, as required in the prior art, can be avoided. Also, for example, after harvesting and/or for removal of the greenhouse, only the web has to be tied and/or gathered together, wherein the protection of the gathered web is automatically provided by the cover of the cover film. Accordingly, the cover film is arranged in particular in a certain area of the web so that it is readily apparent to the operators how the web can be folded and/or gathered together so that the cover film protects the entire web from harmful UV radiation and/or solar radiation. This greatly simplifies handling when using the elongated web.

Preferably, the longitudinal orientation of the welding region of the second connecting region runs at least substantially in the longitudinal web direction of the base film. In particular, the welding regions of the second connecting region are formed as straight, preferably uninterrupted, sections which are aligned in particular in the longitudinal web direction of the base film. Thereby the length of the welding regions can be the same or different—depending on different conditions of use.

In a further preferred embodiment, at least one welding region, preferably all welding regions, of the second connecting region has/have a design different to a straight welding line which is oriented in longitudinal web direction of the base film. In particular, at least one welding line, preferably all welding lines, of the second connecting region can be designed as a straight welding line which is arranged obliquely to the longitudinal web direction and preferably obliquely to the cross direction of the base film. Preferably, the straight welding line can include an angle of at least 5°, preferably between 5° and 80°, more preferably from 10° to 50°, more preferably from 20° to 45°, to the longitudinal web direction.

Moreover, in further preferred embodiments the welding regions of the second connecting region can also have a planar shape instead of a linear design, in particular including an at least substantially triangular surface.

Alternatively or additionally, it can be provided that at least one, preferably all, welding regions of the second connecting region have an at least substantially V-shaped configuration, in particular with the legs of the V being curved. The tip of the V can face the first connecting region, so that preferably the legs of the V can serve to drain off rainwater.

Preferably, the welding regions of the second connecting region do not cross the ventilation openings. In particular, the welding regions of the second connecting region are arranged below the ventilation areas, so that preferably no further ventilation opening is arranged below the welding region of the second connecting region.

In particular, for the purposes of the present disclosure, the "upper region of the elongated web" means the longitudinal edge-side region facing the support structure, in particular the tensioning ropes. The reference is therefore to the installed condition. When the elongated web is used for a roof, the upper region is thus the area facing the roof apex. The "lower region" is the longitudinal edge-side region opposite the upper region. The lower region of the web may be connected to an underground or to other webs.

In addition, it is preferably provided that the elongated webs are held together, gathered and laid together in the non-use state in such a way that the lower end is guided to the upper end, wherein the fastening of the webs takes place at the upper end. This results in particular from the fact that the upper end is to be associated to the support structure.

In a further preferred embodiment, further fastening openings, in particular eyelets, are provided on the further longitudinal edge of the base film and/or in the region of the lower longitudinal edge. The further fastening openings are preferably designed to be reinforced. In addition, the other fastening openings can also be provided for fastening further tensioning means, for example tensioning ropes or the like. The further fastening openings can be used for fastening the web to a substrate or to a further web. If the web is connected to another web, it can be provided that the fastening of both webs to each other can be effected by tensioning means inserted into the further fastening openings. In particular, one tensioning means can also be inserted into both further fastening openings of both webs. In particular, this allows the webs to cover a large area of the cultivated plants.

The other fastening openings can be designed identically and/or similarly, but also differently to the fastening openings. Preferably, the use of tensioning means in the fastening openings and the other fastening openings makes it possible to tension the webs comparatively easily.

Preferably, the fastening openings are spaced substantially equally from one another. In particular, the distance between two adjacent fastening openings is between 10 and 150 cm, preferably between 20 and 70 cm. The further fastening openings can also be spaced essentially equally from one another, either alternatively or additionally. The distance between two neighboring further fastening openings can be between 10 to 150 cm, preferably between 20 to 100 cm.

It is particularly preferred that the first and further fastening openings are arranged offset from one another. In particular, an offset arrangement has the advantage that when the web is tensioned, the tensioning force acts on different areas of the web. If the first and the further fastening openings were arranged opposite each other (in alignment with respect to the cross direction), which is also possible according to the disclosure, however, the effect would be available that in particular a high tension of the web is available in this aligned alignment. Therefore, an offset and/or staggered arrangement of the fastening openings and the further fastening openings is preferably provided.

The ventilation openings may be and/or comprise an at least substantially slot-shaped, circular, oval, and/or rhombus-shaped recesses in the base film.

A slit-shaped design is particularly preferred, as it is comparatively easy to provide in terms of production technology. The slits preferably extend thereby at least substantially in the longitudinal web direction. When the web is stretched, the slit design of the ventilation opening results in a widespread, in particular at least substantially oval, shape of the ventilation opening. Ultimately, different shapes of the ventilation openings allow air exchange and thus contribute to improved ventilation and cultivation of the plants.

In an even more preferable embodiment, it is provided that the first connecting region comprises a continuous welding region extending in the longitudinal web direction of the base film, preferably at least substantially parallel to the upper longitudinal edge of the cover film. In particular, the welding region of the first connecting region can thereby be designed to be at least substantially straight. The multiple welding regions of the second connecting region enable ventilation to continue to be possible via the ventilation openings when the web is stretched, since the distance between two neighboring welding regions of the second connecting region in the stretched state allows a free space to be designed between the base film and the cover film for ventilation and/or deaeration of the covered region.

In a further preferred embodiment, which in particular can be implemented as an alternative to the continuous welding region of the aforementioned embodiment of the first connecting region, it is provided that the first connecting region comprises a plurality of spaced-apart, at least regionally curved and/or bevelled welding regions. The welding regions of the first connecting region preferably span the ventilation openings and preferably do not cross the ventilation openings. In this context, it may be provided that the welding regions of the first connecting region comprise a preferably straight section extending in the longitudinal web direction. However, the welding regions of the first connecting region may also comprise other regions which are, for example, oriented obliquely, in particular orthogonally, to the longitudinal web direction. In particular, the welding region of the first connecting region can also extend over at least 50%, preferably between 50% and 95%, of the width (i.e., the width extending in the cross direction of the base film) of the cover film.

In addition, the welding line and/or the welding region of the second connecting region may preferably be arranged such that water, for example rain, hitting the cover film is first guided along the first connecting region and then drained away by the arrangement and formation of the welding regions of the second connecting region. Preferably, the first and second connecting regions are arranged and formed in such a way that the water does not penetrate at least substantially into the ventilation openings. In this connection, a distance can be provided between the welding regions of the second connecting region and the welding regions of the first connecting region, in particular wherein preferably no welds are provided in this distance, so that this can serve for air circulation and for the entry and exit of air into the ventilation area.

The directed flow and/or drainage of rainwater can be ensured by the first connecting region alone and/or in cooperation with the second connecting region. This means that, according to the disclosure, different forms of the welding regions of the first and/or second connecting regions are possible.

The welding regions of the second connecting region can also be arranged in the gap between two spaced welding regions of the first connecting region. In particular, the welding regions of the second connecting region can span the respective gap. In this context, "arranging in the gap" is to be understood as meaning that the welding regions of the second connecting region are arranged in alignment with the gap between two adjacent welding regions of the first connecting region and enclose a distance to the welding regions of the first connecting region in the cross direction of the base film.

Preferably, the curved and/or bevelled welding region comprise a straight section extending in the longitudinal web direction of the base film and a first section which is immediately adjacent to the straight section and preferably curved and/or bevelled. In particular, the first section can be oriented at least substantially obliquely to the longitudinal web direction and preferably at least substantially in the cross direction of the base film. In particular, the first section of the curved and/or bevelled welding region of the first connecting region may correspond to at least 50%, preferably between 60% to 95%, of the width of the cover film extending in the cross direction of the base film. Thus, in particular, the first section may extend at least substantially across the width of the cover film.

In an even more preferable embodiment, it is provided that the first section is designed to be at least substantially circular arc section-shaped. Alternatively or additionally, it may be provided that the entire curved and/or bevelled welding region of the first connecting region also comprises an at least substantially arc-section-shaped form. Furthermore, the first connecting region and/or the first section can also run obliquely, in particular orthogonally to the cross direction and/or parallel to the longitudinal web direction, and preferably be designed to be continuous.

In particular, the aforementioned shape makes it possible for there to be no backflow for rainwater. Preferably, rainwater hitting the cover film is carried away along the welding regions of the first connecting region. For example, the rainwater can first hit the straight section and afterwards be carried away along the first section. Due to this formation of the welding regions, it is thus provided that at least substantially no rainwater can penetrate into the ventilation openings which are covered by the cover film. Ultimately, this enables rainwater to drain off effectively when the elongated web is in use.

In particular, the curved and/or bevelled welding regions of the first connecting region comprise a second section which adjoins the straight section and lies opposite the first section and is also preferably curved and/or bevelled. The length of the second section may be substantially less than the length of the first section. In particular, the length of the second section is between 1% to 50%, preferably between 3% to 20%, even more preferably between 4% to 15%, of the length of the first section. Alternatively or additionally, the first section and the second section of a welding region can be aligned in opposite directions. Thus, the first section and the second section in particular do not run parallel to each other. The aforementioned embodiment is also particularly advantageous for draining off rainwater that hits the cover film.

In an even more preferable embodiment, it is provided that the second section of a curved and/or bevelled welding region is spaced from the first section of an immediately neighboring region. In particular, the clear distance between the second section and the immediately adjacent first section of the immediately adjacent curved and/or bevelled welding region is between 10% and 200%, preferably between 50% and 150%, even more preferably between 70% and 120%, of the length of the second section. Furthermore, this spacing can also form a passage channel for rainwater run-off. Preferably, this passageway is configured such that at least substantially no ventilation areas are arranged therein. The passage channel formed in this way can be designed in particular along the first section of the curved and/or bevelled welding region.

Furthermore, in an even more preferable embodiment, the welding region of the second connecting region extends over at least part of the length of the straight section of the curved and/or bevelled welding region of the first connecting region. In particular, the length of the welding region of the second connecting region extends between 10% to 90%, preferably between 20% to 70%, even more preferably between 30% to 60%, of the length of the second section of the first connecting region. This arrangement and/or design of the welding region of the second connecting region is also particularly advantageous with regard to the condition of use. Thus, on the one hand, a drainage of rainwater along the passage channels, as they have been described earlier, can be made possible. At the same time, however, in particular a free space can also be formed between the base film and the cover film in the state of use in the region of the ventilation openings. As previously explained, this free space results in particular due to the tension applied to the base film, which leads to a stretching of the base film, whereby the cover film can stand out relative to the base film; even if in the non-use state the cover film and the base film can comprise at least substantially the same length in the region of the ventilation openings.

It is particularly preferably provided that the curved and/or bevelled welding regions of the first connecting region and/or the welding regions of the second connecting region are designed to be continuous. Alternatively or additionally, it may be provided that the first section, the straight section and/or the second section of the curved and/or bevelled welding region of the first connecting region are designed to be at least substantially continuous. A continuous design of the welding region is useful in particular with regard to production engineering specifications. Also, this results in a further advantage with regard to the drainage of rainwater, since in particular it can be ensured that rainwater also cannot penetrate into the ventilation openings through openings available in the welding regions. This protects the cultivated plants when the web is in use.

In an even more preferable embodiment of the disclosure, it is provided that the cover film and/or the base film is/are designed as continuous film web(s) and/or sheets. Preferably, both the cover film and the base film are designed as continuous film webs.

In further embodiments, only the base film can be designed as a continuous film web, wherein the cover film can be composed of individual film sections for covering the ventilation areas.

However, a continuous design of the cover film is particularly advantageous in particular with regard to the reflective properties of the cover film on the weather side, which are required for the gathered and/or held-together state of the elongated web. In particular, the reflective design of the cover film can thus be provided over the entire length of the base film and/or cover film, so that in the gathered state of the elongated web, the cover film can protect the base film from harmful effects of solar radiation and other weathering.

Preferably, the cover film extends over the entire length of the base film. Alternatively or additionally, the cover film can be designed to completely cover the ventilation area. Accordingly, the ventilation area can be reliably protected from external weather influences, such as rain or the like.

In a further preferred embodiment, as already explained above, it is provided that the length of the cover film corresponds at least substantially to the length of the base film, preferably such that the cover film lies flat on the base film in the non-fastened state. Lifting of the cover film relative to the base film can be achieved by (crosswise) stretching, in particular in cross direction, of the base film. This stretching results in the fastening state in particular from the tensioning means inserted in the fastening openings and/or the further tensioning means inserted in the further fastening openings. Accordingly, in particular free spaces are formed in the fastening state which, however, are at least substantially not available in the non-fastening state.

In another particularly preferred embodiment of the disclosure, the curved and/or bevelled welding regions of the first connecting region are designed to be at least substantially the same. Alternatively or additionally, it can be provided that the welding regions of the second connecting region are designed to be at least substantially identical. In particular, an identical design of the welding regions is associated with the advantage of simple in-line production.

Preferably, the cover film is colored white. In this context, it may be provided that additives, in particular titanium dioxide, have been added to the cover film and/or the plastic material of the cover film to achieve the white color. In particular, the white coloring of the cover film can ensure the reflective properties at least on the weather side of the cover film in the state of use.

Furthermore, the present disclosure still relates to the use of at least two webs according to any of the preceding embodiments to form a greenhouse. The webs may be arranged on a frame and/or a support structure by means of tensioning means fastened in the fastening openings of the webs. In particular, the webs are tensioned with a rope tensioned to a frame and/or a support structure via tensioning means arranged in the fastening openings. In particular, the webs may face each other and preferably design a roof for spanning the cultivated plants. In particular, the tensioning means fixed in the fastening openings of the webs can be firmly connected to the frame and/or the support structure. Preferably, the upper longitudinal edges of the webs are aligned and/or arranged at least substantially parallel to each other. In particular, the webs themselves may be oriented in opposite directions to each other, preferably wherein at least substantially a mirror symmetrical arrangement of the webs is made, wherein the mirror axis may be formed by the longitudinal axis of the frame and/or support structure.

With regard to advantages and preferable embodiments of the aforementioned use according to the disclosure, reference may be made in particular to the aforementioned explanations for the elongated web, which can also apply in the same way, without the need for explicit explanation, to the use according to the disclosure. In the same way, explanations concerning the use according to the disclosure may also be transferred to the elongated web according to the disclosure.

In a preferred embodiment, at least two further webs—i.e. at least four webs in total—are used. In particular, the further webs can also be designed according to one of the preceding embodiments. The further webs are likewise connected to a further frame and/or support structure and/or to the aforementioned frame and/or support structure by means of the fastening openings and the tensioning means fastened in the fastening openings. The further webs also face each other and may design a further roof for spanning the cultivated plants. The upper longitudinal edges of the further webs may also in particular be at least substantially parallel to each other, wherein the further webs may also be arranged at least substantially mirror-symmetrically. The two roofs can be connected to one another by means of further tensioning means fastened in the mutually facing further fastening openings of directly neighboring webs. In particular, at least one further tensioning means is used, which is arranged in the further fastening openings of the facing webs of the different roofs. In particular, a large area of the cultivated plants can thus be spanned.

Furthermore, it is clear that in the aforementioned intervals and ranges all interim intervals and individual values are comprised and must be considered as essential for the disclosure, even if these interim intervals and individual values are not specifically provided.

BRIEF DESCRIPTION OF THE DRAWINGS

Further features, advantages, and application possibilities of the present disclosure are provided in the following description of exemplary embodiments shown in the drawing and the drawing itself. All described and/or illustrated features form, by themselves or in any combination, the object of the present disclosure, regardless of their summary in the claims and their dependencies.

It shows.

DETAILED DESCRIPTION

Figure 1:
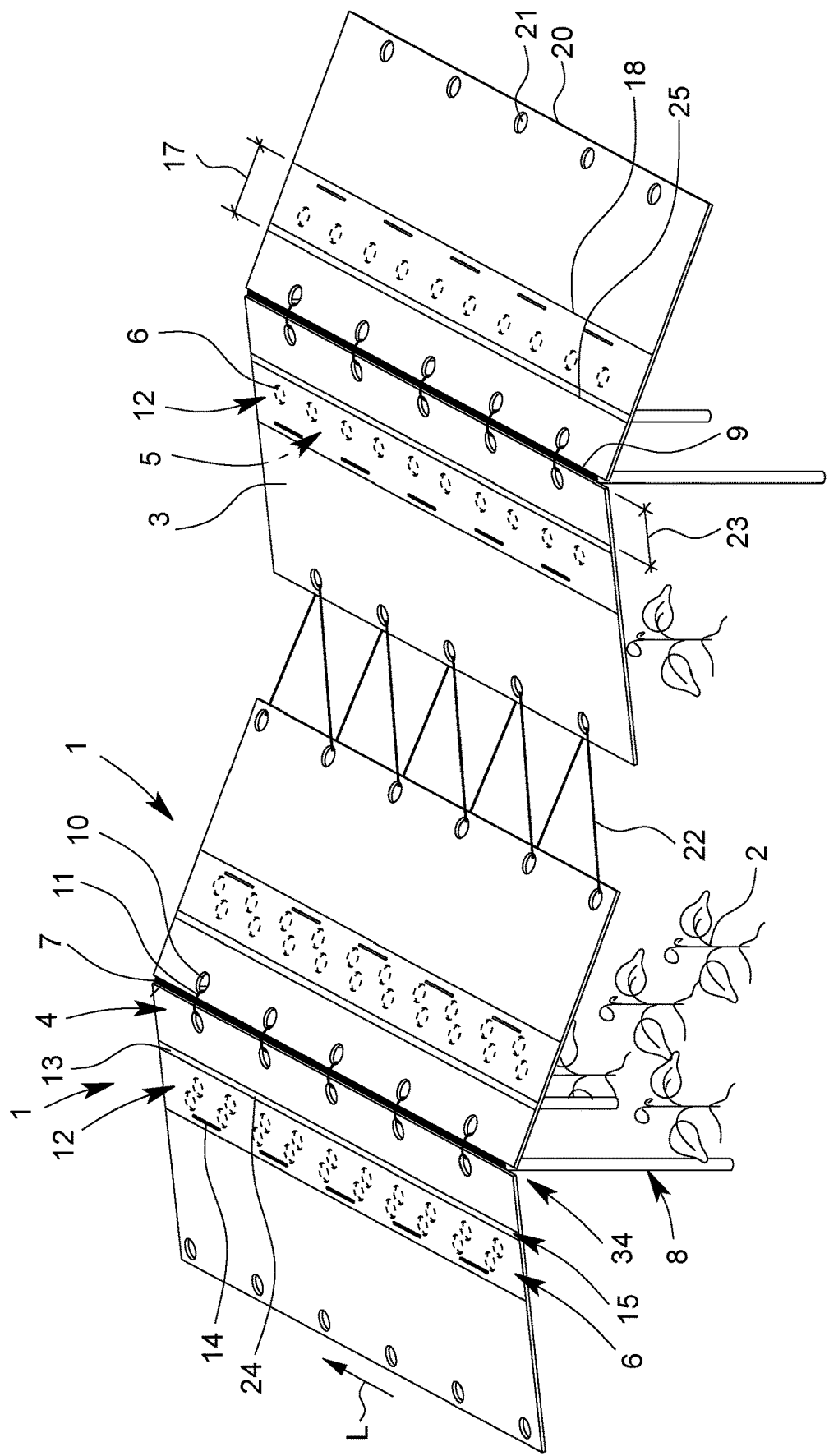
FIG. 1 a schematic perspective illustration of the use of an elongated web according to the disclosure, FIG. 2 a schematic perspective illustration of a further embodiment of an elongated web according to the disclosure in the gathered state, FIG. 3 a schematic perspective illustration of a further embodiment of a web according to the disclosure in the rolled-up state, FIG. 4 a schematic top view of a further embodiment of an elongated web according to the disclosure, FIG. 5 a schematic top view of a further embodiment of an elongated web according to the disclosure, FIG. 6A a schematic illustration of a ventilation opening according to the disclosure, FIG. 6B a schematic illustration of a further embodiment of a ventilation opening according to the disclosure, FIG. 6C a schematic illustration of a further embodiment of a ventilation opening according to the disclosure, FIG. 6D a schematic illustration of a further embodiment of a ventilation opening according to the disclosure, FIG. 7 a schematic top view of a further embodiment of an elongated web according to the disclosure, FIG. 8 a schematic illustration of the connecting regions, FIG. 9 a schematic top view of a further embodiment of an elongated web according to the disclosure, FIG. 10 a schematic sectional view along the section X-X of FIG. 9, FIG. 11 a schematic sectional view along section XI-XI of FIG. 9, FIG. 12 a schematic perspective illustration of a further embodiment of an elongated web according to the disclosure.

FIG. 1 shows an elongated web 1. Furthermore, FIG. 1 shows that the elongated web 1 is used to cover cultivated plants 2. Agricultural cultivated plants 2 may be softfruits, in particular cherries.

The elongated web 1 comprises a base film 3 made of plastic. A ventilation area 5 extending in the longitudinal web direction L is provided in the upper, preferably in the upper longitudinal edge-side region 4 of the base film 3. The ventilation area 5 serves to ventilate the covered area. The ventilation area 5 comprises a plurality of ventilation openings 6.

In the embodiment example shown in FIG. 1, it is provided that the upper longitudinal edge 7 is attached to a support structure 8, namely in particular to a tensioning rope 9.

A distance may thereby be provided between the upper longitudinal edge 7 and the tensioning rope 9.

In particular, a plurality of fastening openings 10, in particular eyelets, are also provided on the upper longitudinal edge 7 and/or on the upper longitudinal edge-side region 4 of the base film 3. The fastening openings 10 may in particular be reinforced. FIG. 1 shows that the fastening openings 10 are arranged at a distance from one another. The fastening openings 10 are used for inserting tensioning means 11, in particular tensioning ropes. The tensioning ropes and/or tensioning means 11 can be connected to the tensioning ropes 9 of the support structure 8. Ultimately, the tensioning means 11 can be used to tension the elongated web 1.

Furthermore, FIG. 1 shows that a cover film 12 is applied to the ventilation area 5. The cover film 12 is also made of plastic. In addition, the cover film 12 is designed to be reflective. Thus, the cover film 12 can have a white top side and/or be colored white throughout. In particular, the reflective properties thereby arise with respect to solar radiation. The cover film 12 is designed to be reflective at least on its weather side, i.e. the side facing the weather. On a bottom side facing the cultivated plants 2, the cover film 12 can be designed to be reflective, but it does not have to be.

FIG. 1 shows that the cover film 12 extends at least substantially in the longitudinal web direction L.

The cover film 12 is welded to the base film 3. The welding is thereby designed in such a way that both a first connecting region 13 and a second connecting region 14 are provided. In the connecting regions 13, 14, the cover film 12 is firmly connected to the base film 3, namely in particular substance-bonded.

The first and second connecting regions 13, 14 thereby extend at least substantially in the longitudinal web direction L. In particular, it may be provided that at least one connecting region 13, 14 also contains regions which extend in the cross direction Q—i.e. at least substantially in a direction running obliquely to the longitudinal web direction L, in particular orthogonally to the longitudinal web direction L.

The first and second connecting regions 13, 14 are each arranged at least in the longitudinal edge-side region 15, 16 of the cover film 12. FIG. 1 shows that the first connecting region 13 is arranged in the upper longitudinal edge-side region 15 of the cover film 12 facing the upper longitudinal edge 7 of the base film 3. The second connecting region 14, on the other hand, is arranged in the lower longitudinal edge-side region 16 of the cover film 12. In particular, it is understood that the upper and lower longitudinal edge-side regions 15, 16 of the cover film 12 comprise not only the outermost longitudinal edges 18, of the cover film 12, but also a region extending from the longitudinal edges 18, 25, which may correspond in particular to between 10% to 30% of the width 17 of the cover film 12.

Furthermore, FIG. 1 shows that the second connecting region 14 facing the lower longitudinal edge 18 of the cover film 12, which is arranged in particular in the lower longitudinal edge-side region 16, comprises a plurality of welding regions 19 spaced apart from one another. The welding regions 19 may thereby be designed as welding sections, in particular welding lines.

Each welding region 19 of the second connecting region 14 is associated with the nearest fastening opening 10 in such a way that the welding region 19 and the fastening opening associated with the welding region 19 lie transversely, preferably orthogonally, to the longitudinal web direction L of the base film 3 and/or in the cross direction Q at least substantially in aligned alignment.

In particular, the longitudinal web direction L corresponds and/or is the longitudinal direction of the base film 3.

Figure 4:
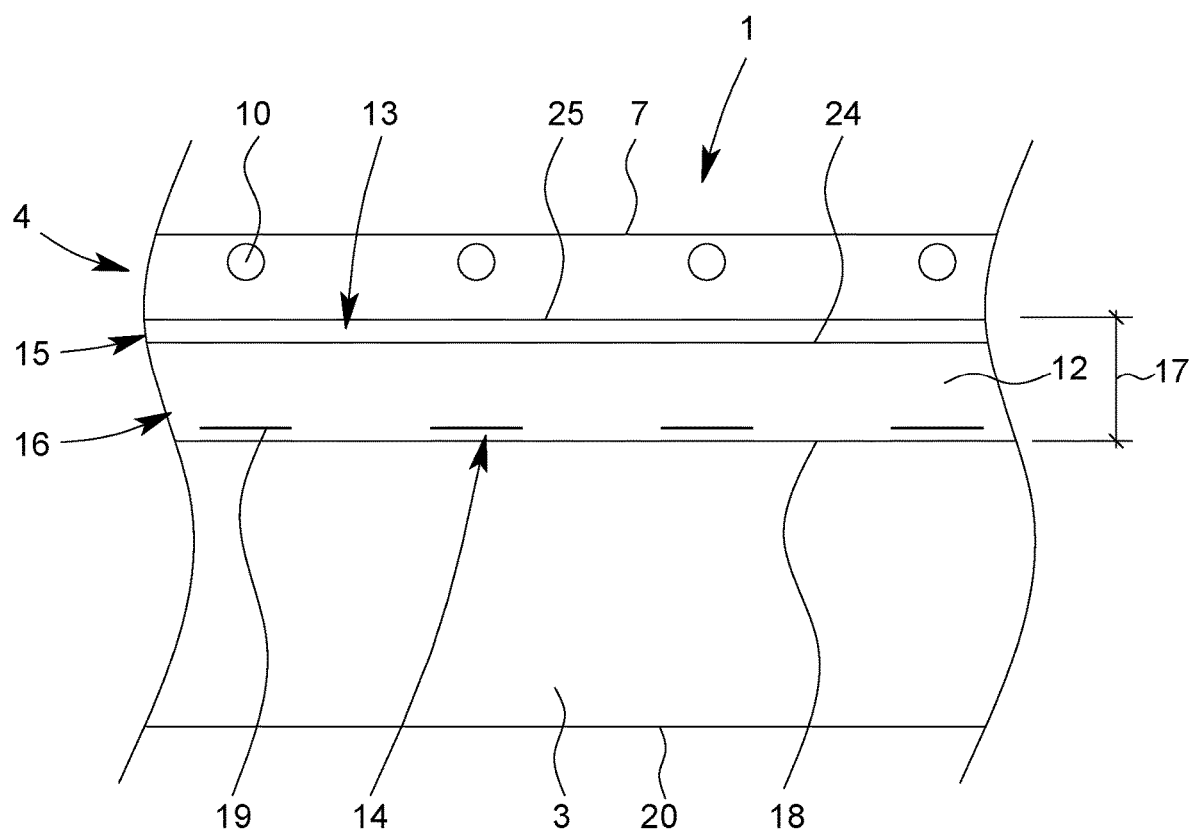

The arrangement in this respect can thereby occur both in the use state, as shown in FIG. 1, and in the non-use state, as shown for example in FIG. 4.

FIG. 4 shows a further embodiment according to the disclosure of an elongated web 1 which, however, is not fastened to a support structure 8. FIG. 4 also shows that the welding regions 19 of the second connecting region 14 are arranged in aligned alignment with the fastening openings 10. It can thereby be provided that the welding region 19, as a length extending in longitudinal web direction L, comprises at least the outer diameter of the fastening openings 10. In principle, however, different lengths are conceivable. At least a section of the welding openings 19 orthogonally to the longitudinal web direction L overlaps with a section of the fastening openings 10. This is understood to be an aligned arrangement of the fastening openings 10 and the welding region 19.

FIG. 4 also shows that the longitudinal orientation of the welding region 19 of the second connecting region 14 runs at least essentially in the longitudinal web direction L of the base film 3. The welding regions 19 can thereby be designed as straight, preferably uninterrupted, welding sections and/or welding lines.

Thereby, the welding regions 19 may comprise a length running in longitudinal web direction L of at least 50 mm to 30 cm, preferably from 10 cm to 15 cm. The fastening opening 10 can thus in particular comprise an outer diameter of less than 30 cm, preferably less than 15 cm, so that preferably the length of the welding region 19 running in longitudinal web direction L exceeds the outer diameter of the fastening opening 10 associated with the welding region 19.

FIG. 1 schematically shows the ventilation openings 6 made in the base film 3 and covered by the cover film 12. It can be seen from FIG. 1 that the welding regions 19 of the second connecting region 14 do not cross the ventilation openings 6. Preferably, no further ventilation openings 6 are arranged below the welding region 19, i.e. facing the lower longitudinal edge 18 of the cover film 12.

Figure 5:
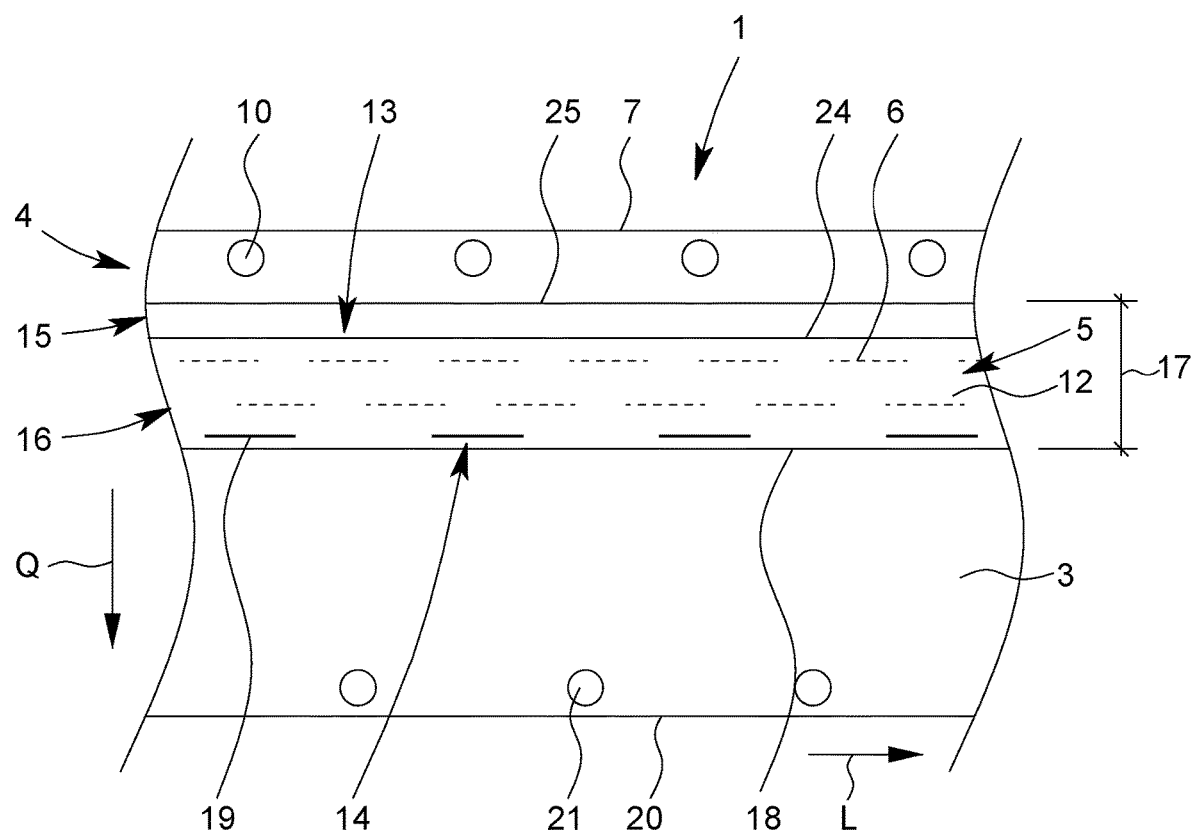

FIG. 5 shows another schematic illustration of a further embodiment of an elongated web 1. FIG. 5 also shows that further fastening openings 21 spaced apart from one another are provided on the lower longitudinal edge 20 of the base film 3. The further fastening openings 21 can thereby be designed in particular to be reinforced. The further fastening openings 21 serve for fastening further tensioning means 22, as can also be seen schematically from FIG. 1. It is understood that the further fastening openings 21 need not be arranged directly at the lower longitudinal edge 20, but ultimately in particular in the lower longitudinal edge-side region of the base film 3, so that a certain distance from the lower longitudinal edge 20 of the base film 3 may also be available.

FIG. 4 shows that the fastening openings 10 are at least substantially equally spaced. The further fastening openings 21 can also be at least substantially equally spaced. Furthermore, the fastening openings 10 and/or the further fastening openings 21 can be designed to be identical in construction to one another, in particular wherein the fastening openings 21 can also be designed to be at least substantially identical in construction to the fastening openings 10.

FIG. 5 shows that the first and the further fastening openings 10, 21 are arranged offset from each other. Preferably, the further fastening openings 21 are each arranged at least substantially centrally between two neighboring fastening openings 10, as shown in FIG. 5.

The ventilation areas 6 can comprise different shapes. FIGS. 6A to 6D, for example, thereby show different shapes of ventilation openings 6 that can be used in an elongated web 1.

Figure 6A:
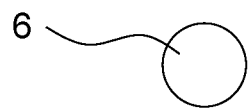
Figure 6B:
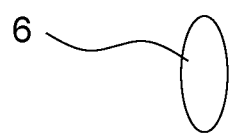
Figure 6C:
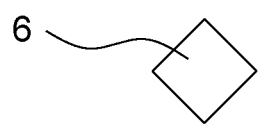
Figure 6D:
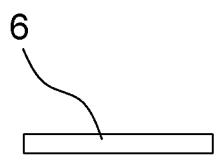

FIG. 6A shows an at least substantially circular ventilation opening 6, whereas FIG. 6B shows an at least substantially oval shape of ventilation opening 6. In addition to the circular shape, at least substantially rhombus-shaped ventilation openings 6 are also possible. FIG. 6D shows that the ventilation opening 6 can also be designed in a slot and/or slit shape. Such a slot and/or slit shape is also shown schematically in FIG. 5.

The ventilation openings 6 are in particular recesses in the base film 3.

In particular, the maximum outer diameter of the ventilation opening 6 can be at least 10 mm, preferably between 20 mm and 100 mm, even more preferably 40 to 60 mm.

Furthermore, the width 17 of the cover film 9 extending in the cross direction Q can also be between 10 cm to 50 cm, preferably between 25 cm+/−25%.

FIG. 5 also shows that the cover film 12 can be spaced from the upper longitudinal edge 7 of the base film 3. In particular, this distance 23 is at least 1 cm, even more preferably between 1 cm to 100 cm, more preferably between 5 cm to 50 cm.

The slots and/or slits, as shown for example in FIG. 5, can also be used instead of circular holes. In particular, the slits can then comprise a length of at least 5 cm running in longitudinal web direction L, preferably between 5 cm and 30 cm, in particular 10 cm+/−30%.

Further, the base film 3 can comprise a width between 0.5 m and 40 m, preferably between 1 m and 20 m, even more preferably 1.5 m and 15 m. In addition, the web 1 can in particular comprise a length of at least 1 m, preferably between 2 m to 1.000 m, even more preferably between 10 m and 800 m. The web 1 can be supplied in the length required by the customer.

Figure 2:
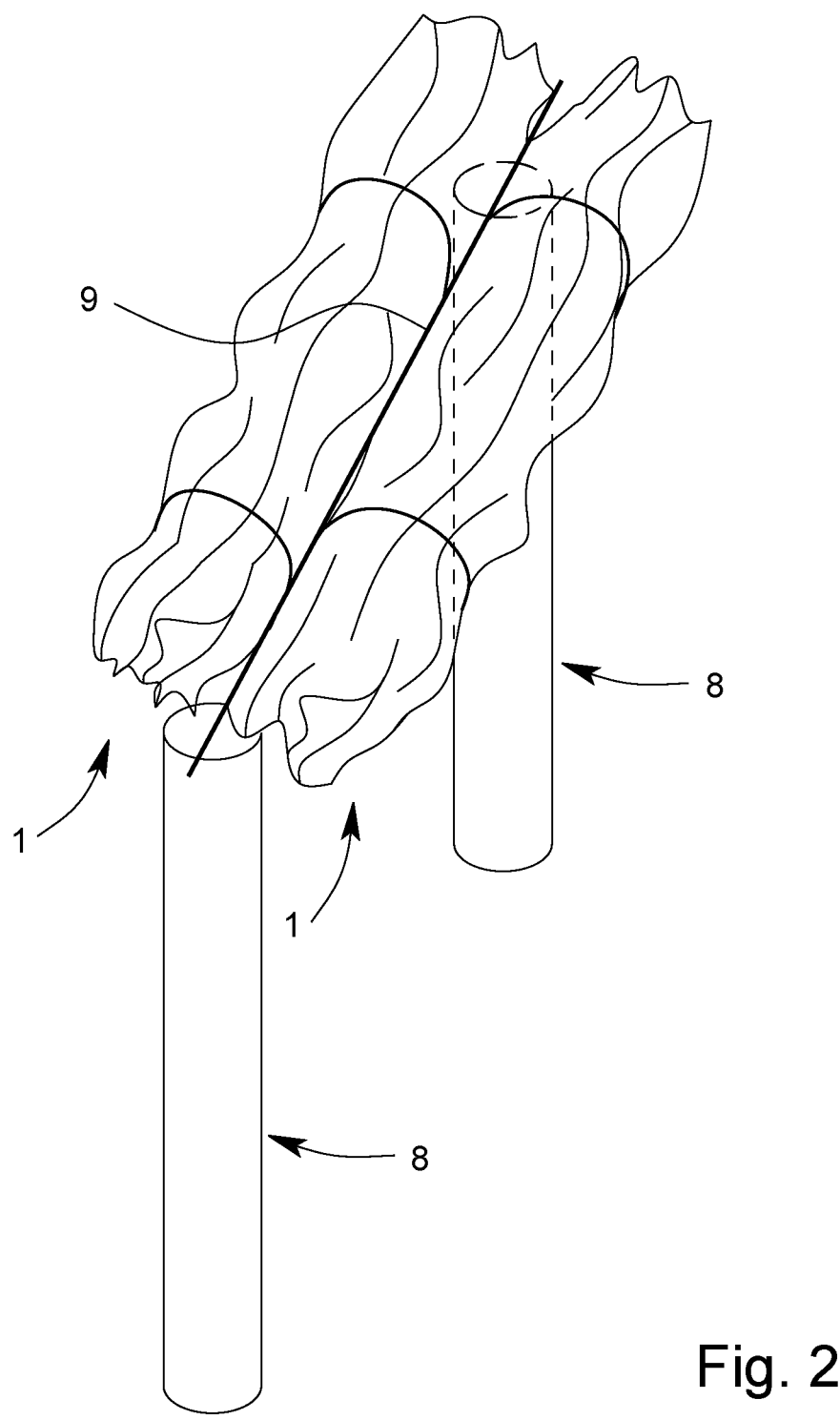

FIG. 2 shows the state of the web 1 in the folded and/or rolled-up non-use state. In particular, it is envisaged that the web 1 is gathered together and fastened to the support structure, in particular to the tensioning rope 9, in such a way that the cultivated plants 2 are no longer covered. Further fastening means, such as straps or the like, can then also be used to fasten the web 1 in this state.

Figure 3:
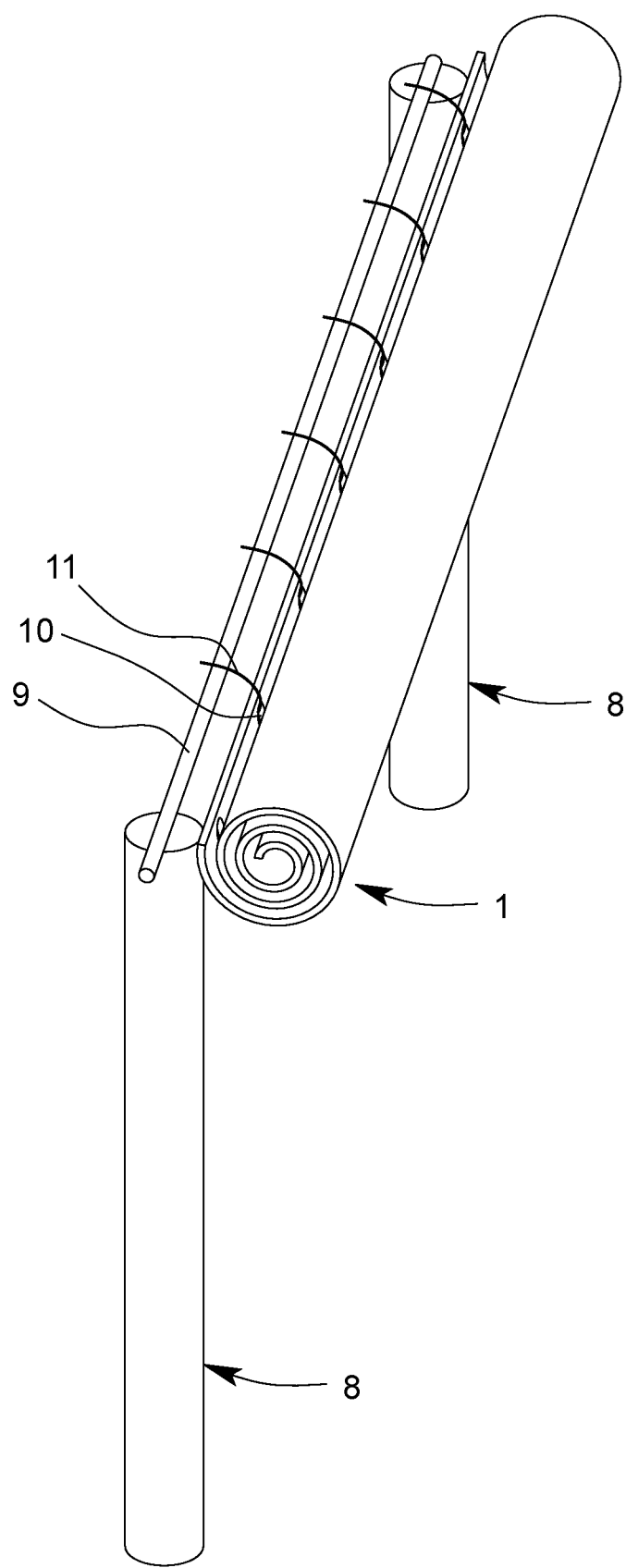

FIG. 3 shows a web 1, for example, in the rolled-up state. In particular, the cover film 12 is thereby arranged in such a way that, in the gathered state according to FIG. 2 and/or in the rolled-up state according to FIG. 3, the cover film 12 faces the weather and the base film 3 is arranged below the cover film 12. Thus, the cover film 12 can protect the base film 3 from solar radiation, in particular harmful UV radiation.

FIG. 1 shows that the first connecting region 13 comprises a continuous welding region 24 extending in the longitudinal web direction L of the base film 3. In particular, the welding region 24 can extend at least substantially parallel to the upper longitudinal edge 7 of the base film 3.

Also, the welding region 24 may be at least substantially parallel to the upper longitudinal edge 25 of the cover film 12.

In particular, the upper longitudinal edge 25 of the cover film 12 is also aligned at least substantially parallel to the upper longitudinal edge 7 of the base film 3.

Figure 7:
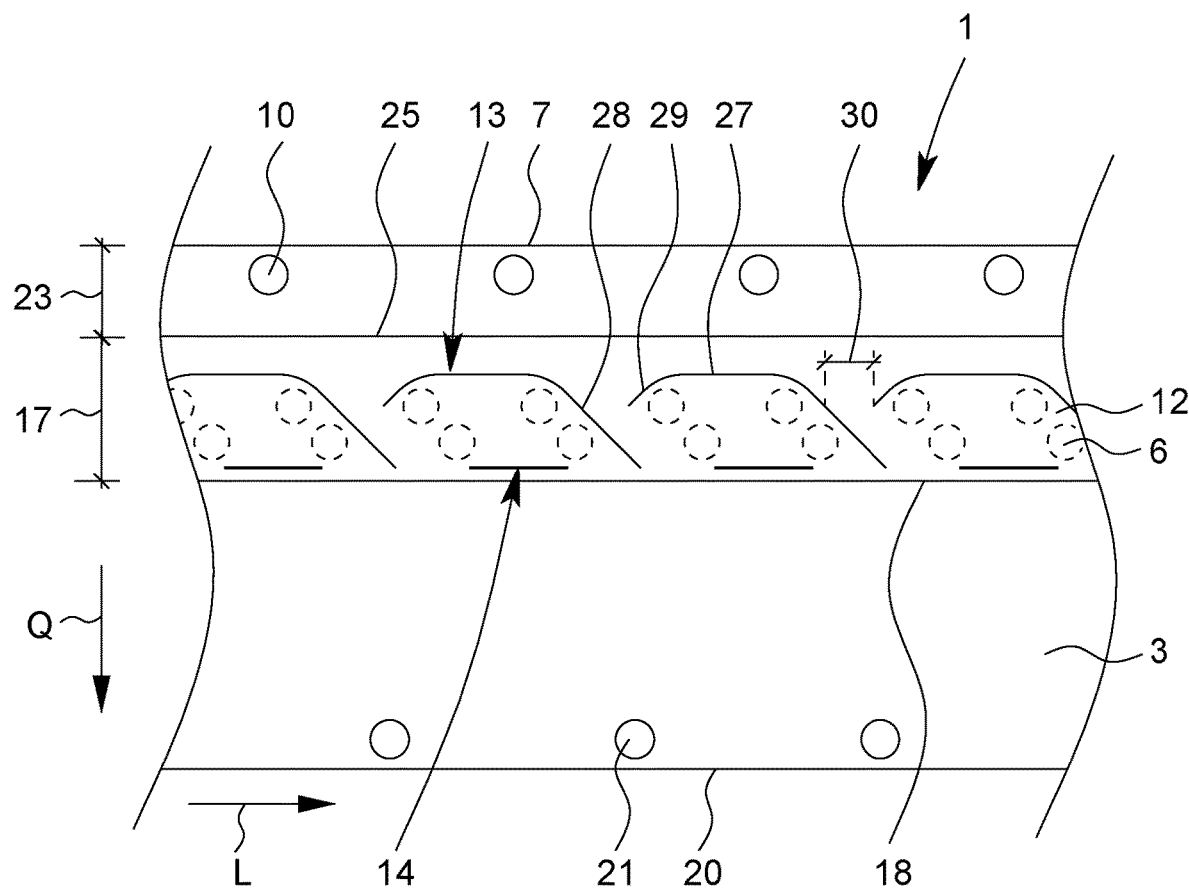
Figure 8:
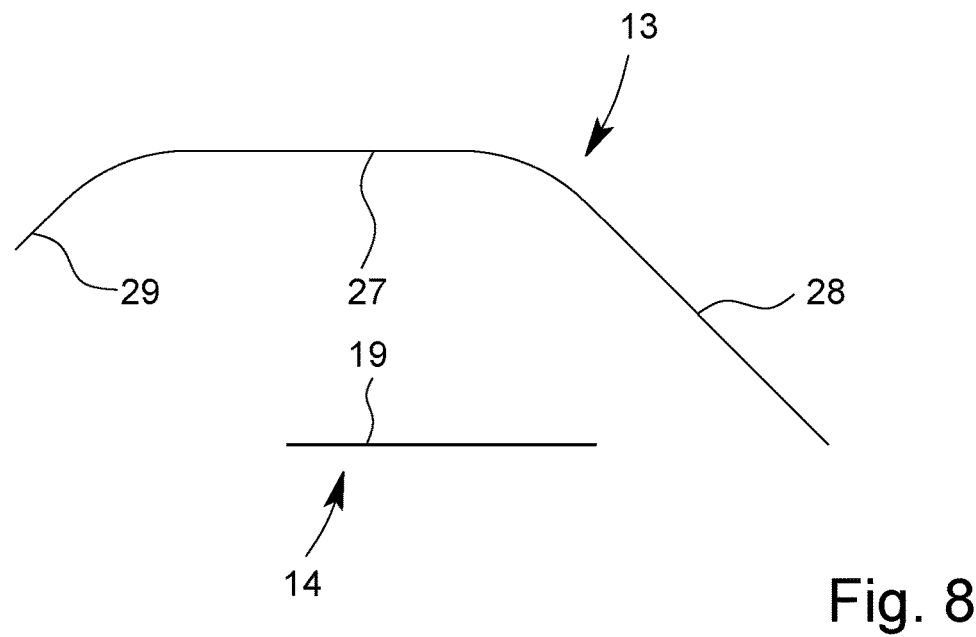

FIGS. 7 and 8 show a further embodiment of the first connection area 13. In this embodiment, no continuous welding line and/or no continuous welding region 24 is provided as shown in FIGS. 1, 4 and 5.

In the example shown in FIGS. 7 and 8, the upper connecting region 13 comprises a curved and/or bevelled welding region 26. FIG. 8 thereby shows a schematic illustration of the first and second connecting regions 13, 14 used in FIG. 7.

FIG. 7 shows that the curved and/or bevelled welding region 26 of the first connecting region 13 comprises a section which is aligned at least substantially in the longitudinal web direction L. Further sections of the curved and/or bevelled welding region 26 run in particular obliquely to the longitudinal web direction L and in particular at least substantially also obliquely to the cross direction Q running orthogonally to the longitudinal web direction L, as can be seen schematically from FIG. 7.

In addition, it can be provided that the curved and/or bevelled welding region 26 comprises a straight section 27 running in the longitudinal web direction L of the base film 3. In particular, the straight section 27 can run at least substantially parallel to the upper longitudinal edge 25 of the cover film 12 and/or at least substantially parallel to the upper longitudinal edge 7 of the base film 3. Furthermore, the bevelled and/or curved welding region 26 may also comprise a first section 28 that may be adjacent to the straight section 27.

This first section 28 can thereby be oriented at least substantially both obliquely to the longitudinal web direction L and obliquely to the cross direction Q and/or in the cross direction Q. FIG. 8 thereby shows that the first section 28 encloses an acute angle to the longitudinal web direction L, preferably an angle between 10° to 85°, even more preferably between 20° to 75°. With respect to the cross direction Q, the first section 28 can also include an acute angle, preferably between 1° to 60°, more preferably between 5° to 20°.

In particular, the first section 28 can extend at least substantially across the width 17 of the cover film 12 and preferably span at least substantially at least 50%, even more preferably between 70% to 90%, of the width 17 of the cover film 12.

Furthermore, the curved and/or bevelled welding regions 26 are arranged in such a way that they span the ventilation openings 6 and preferably also do not cross the ventilation openings 6.

The curved and/or bevelled welding region 26 shown in FIG. 8 comprises an at least substantially sectionally circular arc sectional shape throughout.

FIG. 8 shows that the curved and/or bevelled welding region 26 also comprises a second section 29 opposite the first section 28, which can likewise adjoin the straight section 27. In particular, the second section 29 may thereby be oriented opposite to the first section 28. The second section 29 can also run at an angle to the longitudinal web direction L and preferably also at an angle to the cross direction Q. Thereby, the second section 29 can enclose an acute angle to the longitudinal web direction L, preferably an angle between 10° and 90°, preferably between 30° and 70°. With respect to the cross direction Q, the second section 29 can also include an acute angle of preferably between 1° to 40°, even more preferably between 5° to 20°.

Preferably, the second section 29 is aligned at least substantially mirror-symmetrically to the first section 28, as shown in FIG. 8. The mirror axis can thereby run at least essentially in the cross direction Q.

Furthermore, FIG. 8 shows that the second section 29 can also be designed curved. Moreover, FIG. 8 shows that the length of the second section 29 is less than the length of the first section 28, preferably wherein the length of the second section 29 corresponds to between 1% to 50% of the length of the first section 28.

In FIG. 7, it is shown that the second section 29 of a curved and/or bevelled welding region 26 is spaced from the first section 28 of an immediately neighboring curved and/or bevelled welding region 26 by a clear distance 30. This clear distance 30 can correspond to between 10% to 300%, preferably between 70% to 120%, of the length of the second section 29, as is also shown schematically in FIG. 7.

The clear distance 30 forms a passage channel which can be used for draining off water. In particular, this passage area thereby runs at least substantially parallel to the first section 28. Preferably, no ventilation opening 6 is arranged in this passage channel, as shown in FIG. 7. Thus, the preferred shape of the curved and/or bevelled welding region 26 preferably results in an effective drainage of rainwater, so that in particular also no backflow for rainwater into the ventilation openings 6 is available. Ultimately, in the state of use, the rainwater impinges on the cover film 12 and must be drained away from the latter so that the rainwater cannot penetrate into the ventilation openings 6 and thus into the covered area, which would otherwise have a harmful effect on the cultivated plants 2.

FIG. 7 shows that the welding region 19 of the second connecting region 14 extends at least substantially over part of the length of the straight section 27 of the curved and/or bevelled welding region 26 of the first connecting region 13. Thereby, the welding region 19 may extend at least substantially parallel to the straight section 27. Furthermore, it may be provided that the length of the welding region 19 extending in longitudinal web direction L corresponds in particular between 10% to 90%, preferably between 20% to 70%, of the length of the straight section 27 of the first connecting region 13.

Figure 9:
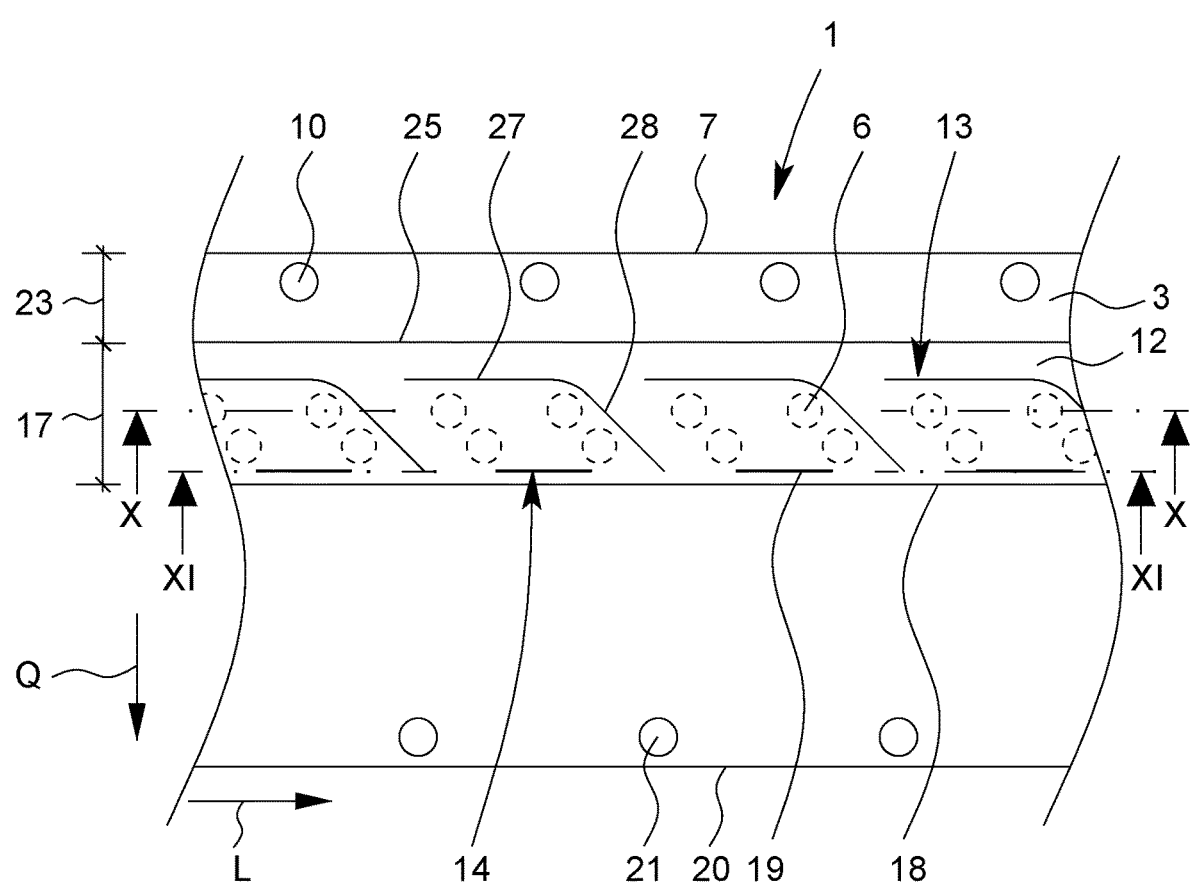
Figure 11:
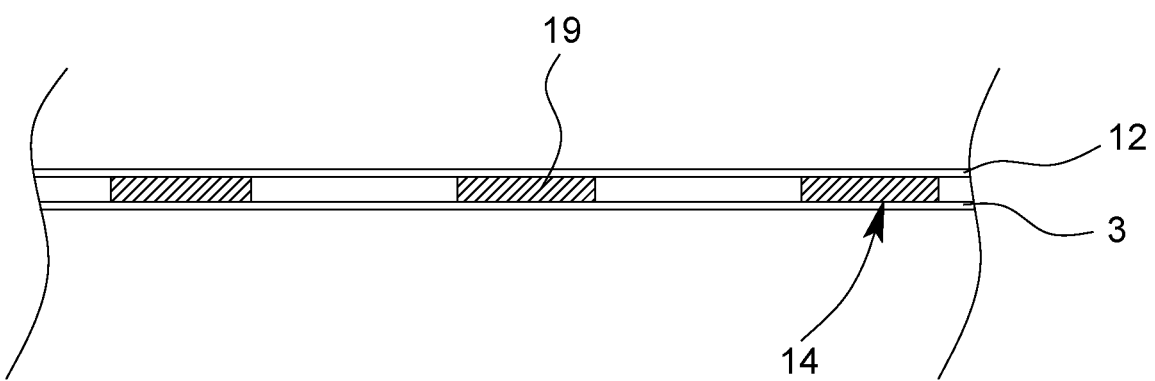

Such an embodiment offers the advantage that air can thus escape via the ventilation openings 6 even in the tensioned state of the web 1, ultimately through the spacing between the welding region 19 and the first section 28. Such a spacing is thereby also shown schematically in FIG. 11, which shows a section XI-XI from FIG. 9. FIG. 9 shows an embodiment of the curved and/or bevelled welding region 26 without second sections 29. FIG. 11 thereby shows the possible inlet openings for air to ventilate the covered area.

Figure 10:
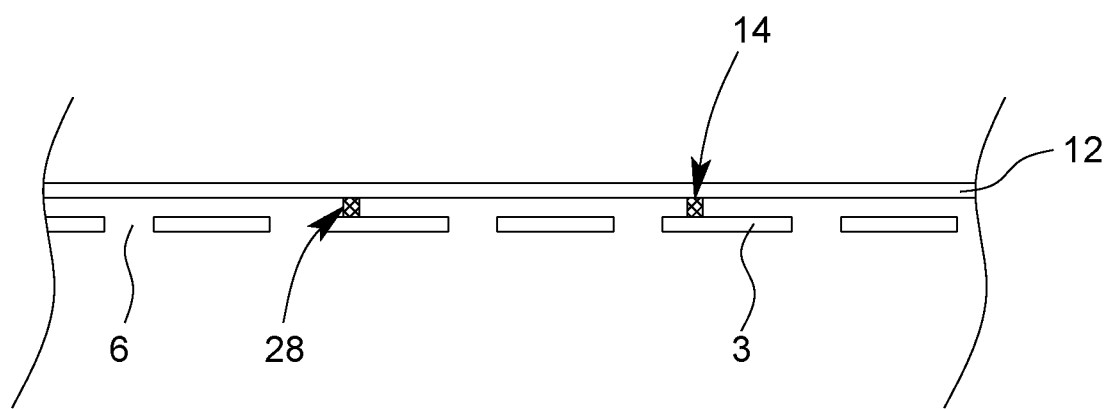

FIG. 10, on the other hand, shows a section X-X from FIG. 9 and illustrates that the ventilation openings 6 are recesses in the base film 3.

In the embodiment shown in FIG. 9, it is further provided that the curved and/or bevelled welding regions 26 of the first connecting region 13 and the welding regions 19 of the second connecting region 14 are each designed as continuous welding sections and/or welding lines.

Furthermore, a continuous design of these welding regions 19, 26 is also associated with the advantage that, preferably, there is no longer any backwater available for water hitting the cover film 12 in the event of rain.

In the embodiments shown, both the cover film 12 and the base film 3 are designed as a continuous film web. FIG. 1 shows that the cover film 12 extends over the entire length of the base film 3. Furthermore, the cover film 12 is designed to completely cover the ventilation area 5 and to cover all ventilation openings 6 of the ventilation area 5.

Figure 12:
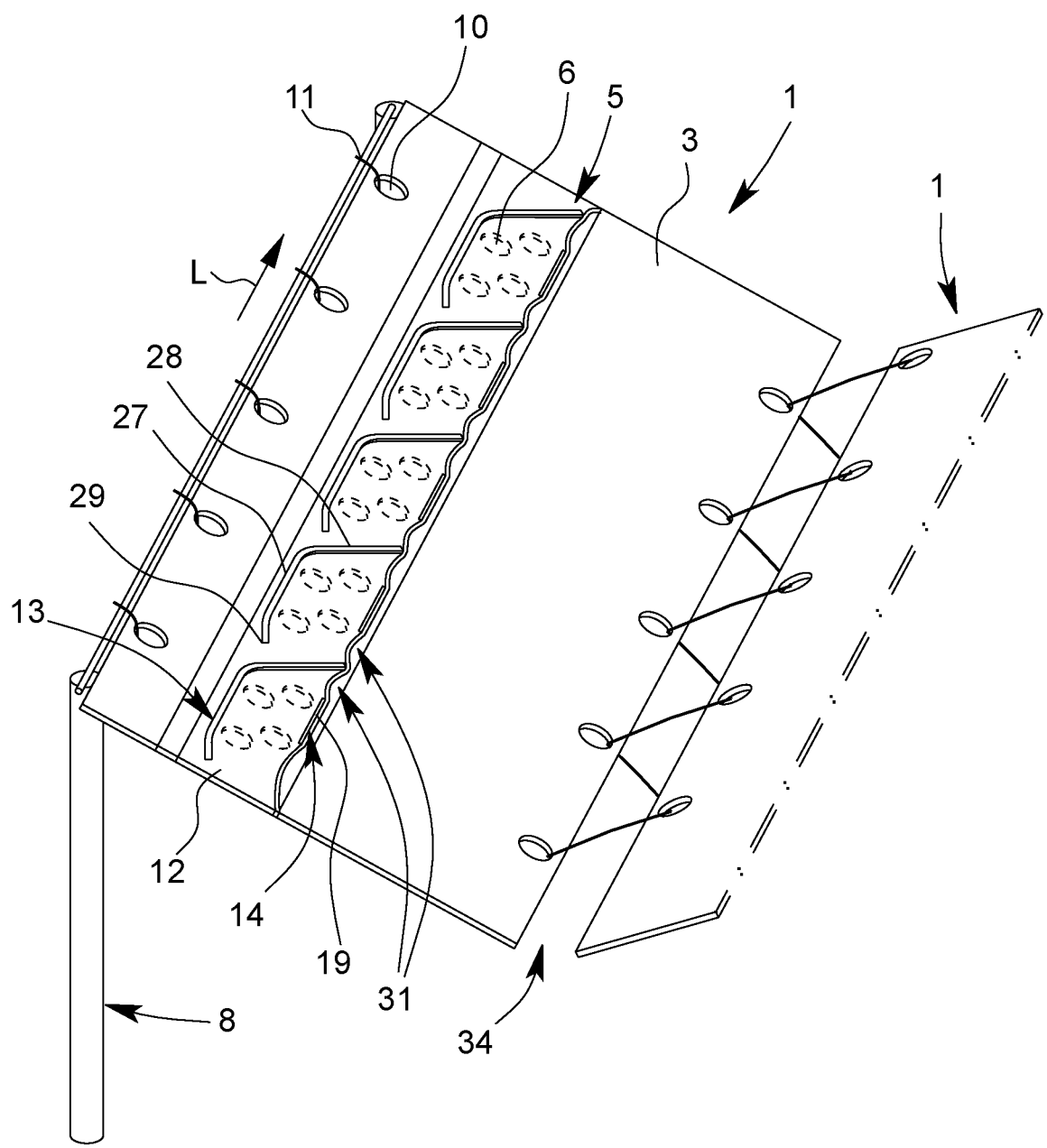

FIG. 12 shows schematically that the length of the cover film 12 corresponds at least essentially to the length of the base film 3. However, free spaces 31 are nevertheless created in the fastening state and/or in the used-state of the elongated web 1 by the fact that the base film 3 is tensioned, in particular by tensioning means 11, 22 inserted in the fastening openings 10, 21. By pulling and/or stretching the base film 3, the free spaces 31 are then created in the area of the ventilation area 5 even if the cover film 12 and the base film 3 have the same length in the non-used state. Air can then escape from the covered area via the ventilation area 5 and/or penetrate into the covered area via these free spaces 31, which are created by lifting the cover film 12 at least in certain areas relative to the base film 3. Furthermore, by designing the welding regions 19 so that a distance is provided between two neighboring welding regions 19, air is also allowed to enter and/or exit the free spaces 31 in this regard. In the non-fastened state, the cover film 12 then lies flat on the base film 3, and in particular so that no free spaces 31 are available. In particular, the free spaces 31 are not caused until the use state.

Furthermore, it may be provided that the width 17 of the cover film 12 corresponds at least substantially to the width of the ventilation area 5.

FIG. 7 shows that the curved and/or bevelled welding regions 26 of the first connecting region 13 are designed to be at least substantially the same. Furthermore, FIG. 7 shows that the welding regions 19 of the second connecting region 14 are also designed to be at least substantially the same.

It is not shown that the cover film 12 is colored white. The white coloring can be achieved in particular by admixing additives to the plastic material of the cover film 12, which can lead in particular to the reflective property of the cover film 12 at least on the weather side. For example, the cover film 12 can comprise titanium dioxide as an additive.

Figure 13:
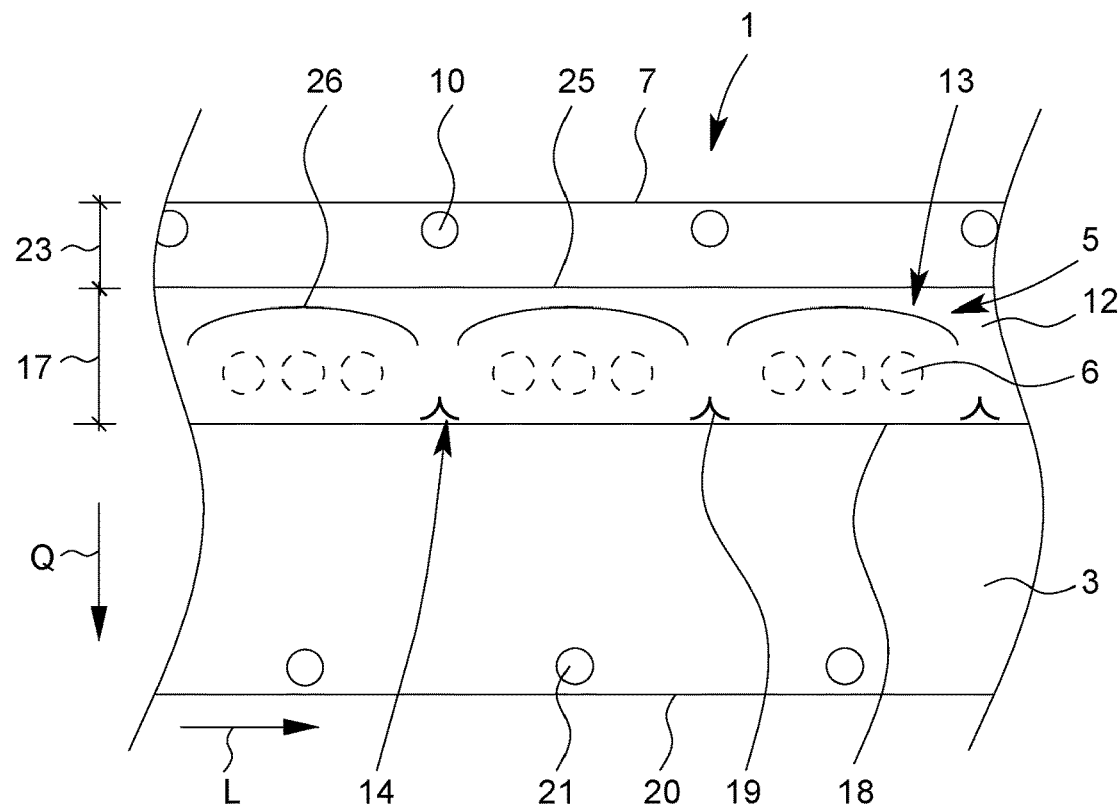
FIG. 13 illustrates another exemplary embodiment of an elongated web according to the disclosure.
Figure 14:
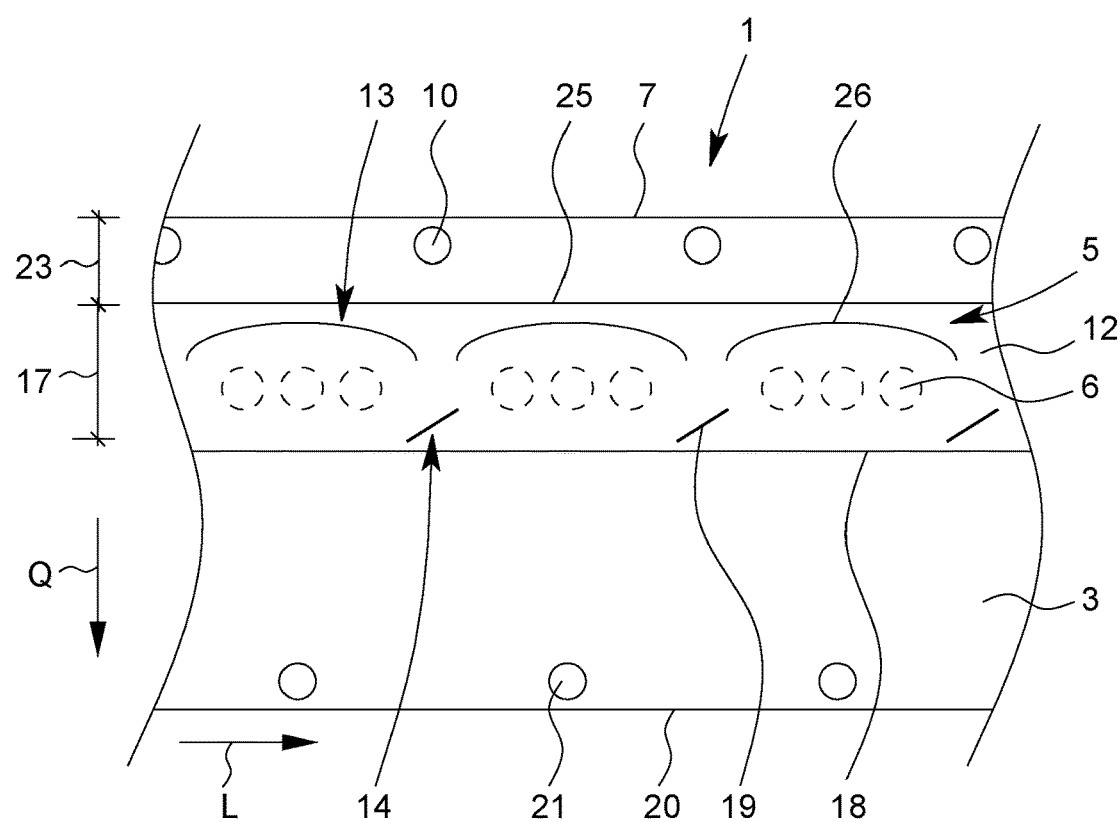
FIG. 14 illustrates yet another exemplary embodiment of an elongated web according to the disclosure.
Figure 15:
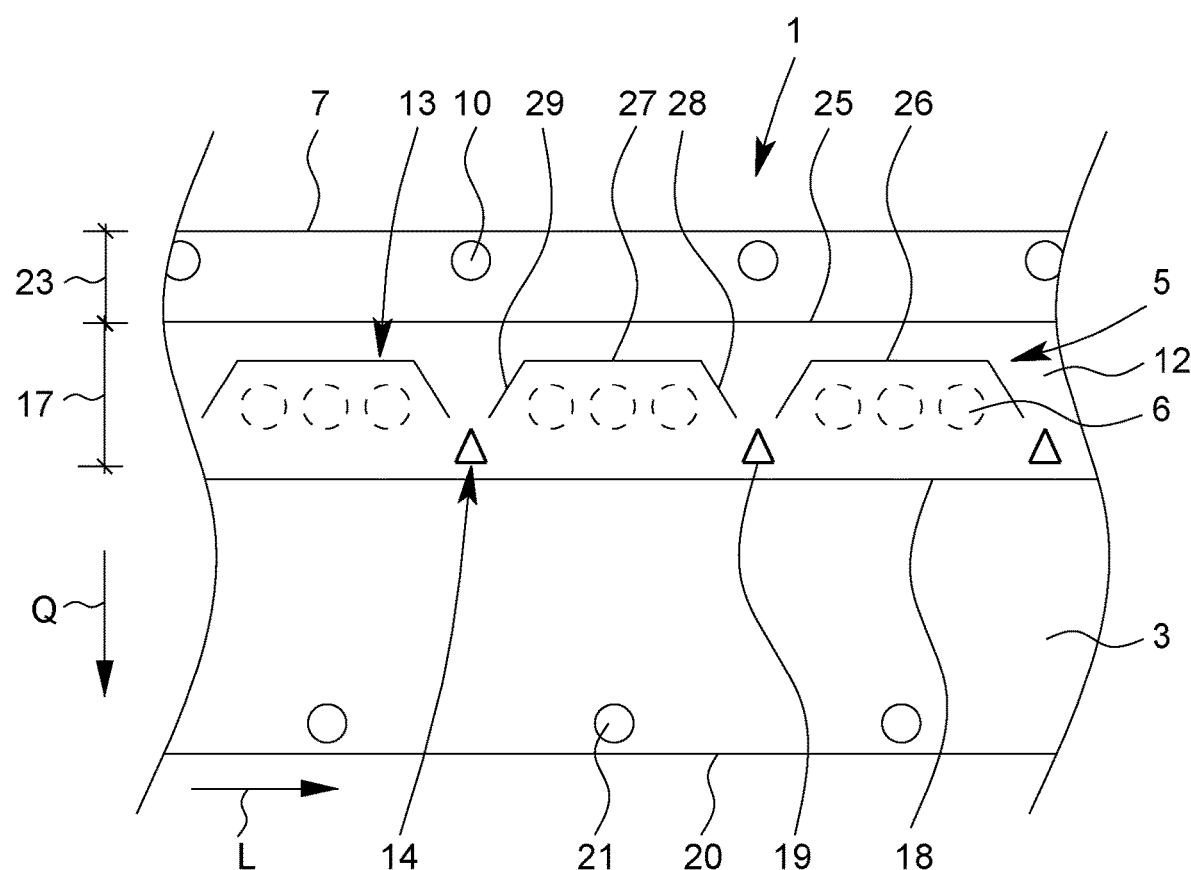
FIG. 15 illustrates a still further exemplary embodiment of an elongated web according to the disclosure.

The FIGS. 13 to 15 show further preferred embodiments. The welding regions 19 of the second connecting region 14 are each in alignment with the corresponding fasting opening 10. Further, the first connecting region 13 and the second connecting region 14 are designed in such a way that water hitting the cover film 12 can be first guided along the first connecting region 13 and then drained away by the arrangement and formation of the welding regions 19 of the second connecting region 14.

In particular, FIGS. 13 to 15 show that the first and second connecting regions 13, 14 are arranged and formed in such a way that the water does not penetrate at least substantially into the ventilation openings 6.

FIG. 14 shows that a distance (in cross direction Q) can be provided between the welding regions 19 of the second connecting region 14 and the welding regions 26 of the first connecting region 13, in particular wherein preferably no welds are provided in this distance, so that this can serve for air circulation and for the entry and exit of air into the ventilation area 5.

FIG. 14 further shows that at least one welding line/region 19, preferably all welding lines, of the second connecting region 14 can be designed as a straight welding line which is arranged obliquely to the longitudinal web direction L and preferably obliquely to the cross direction Q of the base film 3. The straight welding line 19 can include an angle from 20° to 45° to the longitudinal web direction L.

FIG. 15 shows that the welding regions 19 of the second connecting region 14 can also have a planar shape instead of a linear design, in particular including an at least substantially triangular surface as shown in FIG. 15.

On the other hand, FIG. 13 shows that at least one, preferably all, welding regions 19 of the second connecting region 14 have an at least substantially V-shaped configuration, in particular with the legs of the V being curved. The tip of the V faces the first connecting region 13, so that preferably the legs of the V can serve to drain off rainwater.

Further, FIGS. 13 to 15 show that the welding regions 19 of the second connecting region 14 are arranged in the gap between two spaced welding regions 26 of the first connecting region 13. In particular, the welding regions 19 of the second connecting region 14 span the respective gap and are in alignment with the corresponding gap, wherein there can be a distance between the welding regions 19 of the second connecting region 14 and the welding regions 26 of the first connecting region 13, namely in cross direction Q.

FIGS. 13 to 15 also show a further preferred design of the curved and/or bevelled welding regions 26 of the first connecting region 13 which can in particular be used alternatively to the design shown in FIG. 7.

The curved welding line 26, as shown in FIGS. 13 and 14, is preferably at least substantially circular arc section-shaped and/or arc section-shaped. Thereby, the curved welding line 26 can be formed symmetrically, preferably mirror symmetric with respect to a mirror axis extending substantially in cross direction Q. The fastening openings 10 can be arranged in the gaps formed between adjacent curved welding regions 26 and/or span these and be arranged in alignment with them, even if a distance is provided between the fastening openings 10 and curved welding regions 26 of the first connecting region 13.

FIG. 15 shows bevelled connecting regions 26 of the first connecting region 13, which are in particular not curved. The bevelled connecting region 26 can have a straight section 27 extending at least substantially in the longitudinal web direction L and a first section 28 which is bevelled relative to the straight section 28. The first section 28 includes an angle of between 20° and 90°, preferably between 30° and 80°, to the longitudinal web direction L and/or to the straight section 27.

In addition, the bevelled welding region 26 has a second section 29 arranged opposite to the first section 28. In the embodiment example shown in FIG. 15, the first and the second sections 27, 28 have at least substantially the same length and between the facing first and second sections 28, 29 of two adjacent bevelled welding regions 26 a clearance/clear distance can be enclosed which is preferably aligned with the corresponding fastening opening 10 and/or with the corresponding welding region 19 of the second connecting region 14.

The second section 29 also preferably encloses an angle between 20° to 90°, more preferably between 30° to 80°, to the longitudinal web direction L and/or to the straight section 27. Furthermore, the second section 29 may be arranged in the opposite direction to the first section 28.

In particular, FIG. 15 shows that the bevelled welding regions 26 are at least substantially symmetrical, preferably mirror symmetrical, in particular with the mirror axis running at least substantially in cross direction Q.

FIG. 1 shows the use of at least two elongated webs 1 according to one of the preceding embodiments to form a greenhouse. The webs 1 are connected, in particular tensioned, to a support structure 8, in particular to a tensioning rope 9 attached to the support structure 8, by means of tensioning means 11 attached in the fastening openings 10 of the webs 1.

The tensioning rope 9 can thereby be a component of the support structure 8. The webs 1 facing each other can design a roof 34 for spanning the cultivated plants 2. In particular, it may be provided that the upper longitudinal edges 7 of the base film 3 face each other directly and enclose only a small distance from each other, in particular this distance is less than 50 cm, preferably less than 30 cm, even more preferably less than 20 cm.

The webs 1 can also be aligned at an angle to one another and/or, in further embodiments, run at least substantially parallel to an underground. The tensioning means 11 inserted in the fastening openings 10 can be firmly connected to the support structure 8. In particular, the upper longitudinal edges 7 of the webs 1 may be at least substantially parallel to each other.

Furthermore, FIG. 1 shows that ultimately two roofs 34 are formed, wherein the second roof area is also formed by two elongated webs 1 which are arranged in accordance with the embodiment described above. These further webs 1 are also connected to the frame and/or the same support structure 8 by means of tensioning means 11 inserted in the fastening openings 10. Facing each other, the further webs 1 can also design a further roof 34 for spanning the cultivated plants 2. The two roofs 34 are connected to each other, namely via the further fastening openings 21. At least one further tensioning means 22 can thereby be arranged in the further fastening openings 21 of the facing webs 1 of the two roofs 34. Moreover, the lower longitudinal edges 20 of the base film 3 may extend at least substantially parallel to each other. Furthermore, it may be provided that a distance is available between the facing lower longitudinal edges 20 of the webs 1. In particular, this distance is less than 100 cm, preferably less than 50 cm, even more preferably less than 30 cm.

By lining up roofs 34 formed by at least two webs 1, it is possible to span a large area so that a large area is available for planting cultivated plants 2. All the roofs 34 can together design a greenhouse.

Ultimately, a plurality of roofs 34 may be attached to the support structure 8, so that preferably a common support structure 8 is available. It is understood thereby that the webs 1 may be attached to different tensioning ropes 9. Preferably, the tensioning ropes 9 also run at least substantially parallel to each other, which in particular simplifies the at least substantially parallel arrangement of the roofs 34.

LIST OF REFERENCE SIGNS 1 elongated web
2 cultivated plants
3 base film
4 upper area of 3
5 ventilation area
6 ventilation openings
7 upper longitudinal edge of 3
8 support structure
9 tensioning rope
10 fastening openings
11 tensioning means for 10
12 cover film
13 first connecting region
14 second connecting region
15 upper longitudinal edge-side region of 12
16 lower longitudinal edge-side region of 12
17 width of 12
18 lower longitudinal edge of 12
19 welding region of 14
20 lower longitudinal edge of 3
21 further fastening openings
22 further tensioning means for 21
23 distance from 12 to 7
24 welding region of 13
25 upper longitudinal edge of 12
26 curved and/or bevelled welding region of 13
27 straight section of 26
28 first section of 26
29 second section of 26
30 clear distance
31 free space
34 roof
L longitudinal web direction
Q cross direction

The invention claimed is:

1. An elongated web configured to cover agricultural plants comprising:
a base film made of plastic,
wherein in the upper region of the base film there is provided a ventilation area extending in the longitudinal web direction and having a plurality of ventilation openings,
wherein a plurality of spaced-apart fastening openings configured to fasten tensioning ropes, are provided on the upper longitudinal edge of the base film,
wherein a cover film of plastic, which runs in the longitudinal web direction of the base film and is reflective on a weather side, is applied to the ventilation area, and
wherein the cover film is welded to the base film in a first and a second connecting region extending in the longitudinal web direction of the base film, wherein the first and the second connecting region are each arranged at least in the longitudinal edge-side region of the cover film, wherein the second connecting region facing the lower longitudinal edge of the cover film has a plurality of welding regions spaced apart from one another, and wherein each welding region of the second connecting region is associated with a nearest fastening opening, and wherein the welding region and the fastening opening associated with the welding region lie transversely to the longitudinal web direction of the base film.

2. The elongated web according to claim 1, wherein one or more of:
the longitudinal orientation of the welding regions of the second connecting region runs at least substantially in the longitudinal web direction of the base film, and
the welding regions of the second connecting region do not cross the ventilation openings.

3. The elongated web according to claim 1, further comprising reinforced, fastening openings, configured to fasten tensioning ropes, provided at a distance from one another on the lower longitudinal edge of the base film.

4. The elongated web according to claim 1, wherein one or more of:
the fastening openings are at least substantially equally spaced from one another,
the further fastening openings are at least substantially equally spaced from one another, and
the first and further fastening openings are arranged offset from one another.

5. The elongated web according to claim 1, wherein the ventilation openings are at least substantially slot-shaped, circular, oval or rhombus-shaped recesses in the base film.

6. The elongated web according to claim 1, wherein the first connecting region has a continuous welded region extending in the longitudinal web direction of the base film.

7. The elongated web according to claim 1, wherein the first connecting region has a plurality of welding regions which are spaced apart from one another, are curved and/or beveled at least in regions, span at least one ventilation opening and do not cross the ventilation openings.

8. The elongated web according to claim 1, wherein the curved and/or beveled welding regions have a straight section running in the longitudinal web direction of the base film and a curved and/or beveled first section directly adjoining the straight section.

9. The elongated web according to claim 1, wherein the curved and/or beveled welding regions have a curved and/or beveled second section adjoining the straight section and opposite the first section, wherein a length of the second section is less than a length of the first section and/or wherein the length of the second section is between 1% to 50% of the length of the first section and/or wherein the first section and the second section of a curved and/or beveled welding region are oriented in opposite directions to one another.

10. The elongated web according to claim 1, wherein the second section of a curved and/or beveled welding region is spaced apart from the first section of an immediately adjacent curved and/or beveled welding region wherein a clear distance between the second section and an immediately adjacent first section of an immediately adjacent curved and/or beveled welding region is between 10% to 300% of the length of the second section and/or
in that the welding region of the second connecting region extends over at least part of the length of the straight section of the curved and/or beveled welding region of the first connecting section, wherein the length of the welding region of the second connecting region is between 10% to 90% of the length of the straight section of the first connecting region.

11. The elongated web according to claim 1, wherein the curved and/or beveled welding regions of the first connecting region and/or the welding regions of the second connecting region are formed continuously.

12. The elongated web according to claim 1, wherein the cover film and/or the base film is formed as a continuous film web, wherein the cover film extends over the entire length of the base film and/or wherein the cover film is formed to completely cover the ventilation area and/or
the length of the cover film corresponds at least substantially to the length of the base film in such a way that the cover film lies flat on the base film in the non-used state.

13. The elongated web according to claim 1, wherein the cover film is colored white on at least one side.

14. At least two webs according to claim 1, the at least two webs configured for constructing a greenhouse, the webs being arranged on a support structure by the tensioning ropes fastened in the fastening openings of the webs, the webs facing one another forming a roof for spanning the cultivated agricultural plants, the tensioning ropes fastened in the fastening openings of the webs being connected to the support structure and/or the upper longitudinal edges of the base film of the webs being arranged at least substantially parallel to one another.

15. The two webs according to claim 14, wherein at least two further webs are provided which are also arranged on a further and/or the support structure by the tensioning ropes fastened in the fastening openings of the webs, the further webs facing one another forming a further roof and configured to span the cultivated agricultural plants, the roofs being connected to one another by further tensioning ropes fastened in the mutually facing further fastening openings of directly adjacent webs of the two roofs.

* * * * *

UNITED STATES PATENT AND TRADEMARK OFFICE
CERTIFICATE OF CORRECTION

| | | |
|---|---|---|
| PATENT NO. | : 12,402,575 B2 | Page 1 of 1 |
| APPLICATION NO. | : 18/137581 | |
| DATED | : September 2, 2025 | |
| INVENTOR(S) | : Dimitrios Daios | |

It is certified that error appears in the above-identified patent and that said Letters Patent is hereby corrected as shown below:

On the Title Page

Item (72) "Inventors", Column 1, Line 6, please delete "Salonika" and insert -- Thessaloniki --, therefore.

Item (30) "Foreign Application Priority Data", Column 1, Line 17, please delete "Jul. 5, 2022" and insert -- Jun. 9, 2022 --, therefore.

Signed and Sealed this
Seventh Day of October, 2025

John A. Squires
*Director of the United States Patent and Trademark Office*